July 11, 1939.  K. NUCHTERLEIN  2,165,903
REFLEX CAMERA
Filed April 15, 1937  2 Sheets-Sheet 1
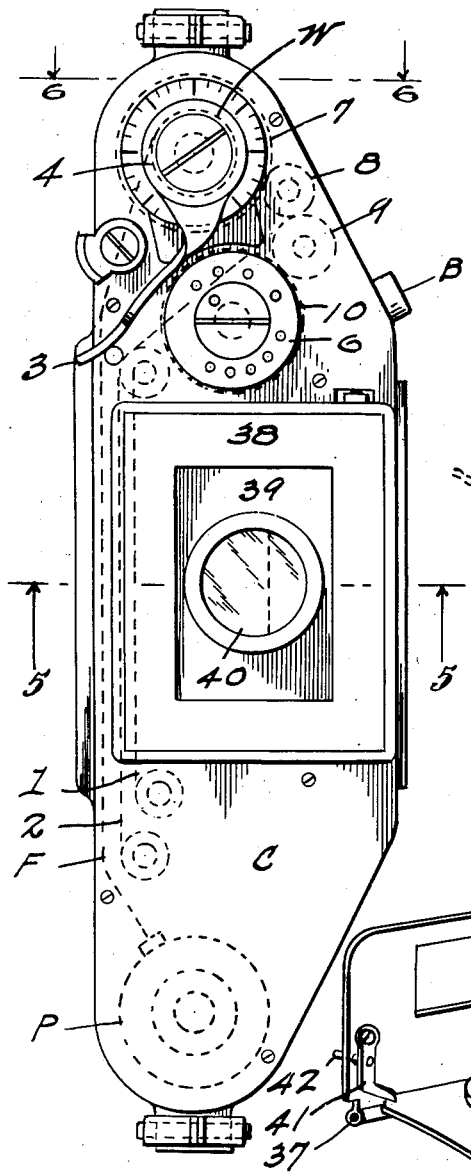
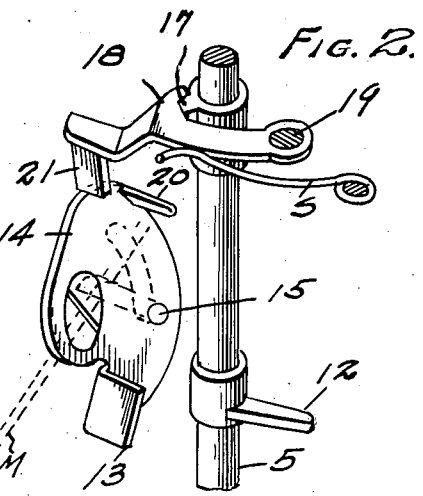
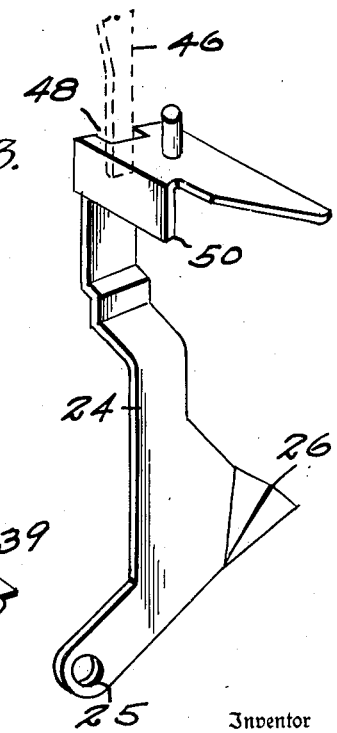
Inventor
KARL NUCHTERLEIN
By Chas K. Davies & Son
Attorney

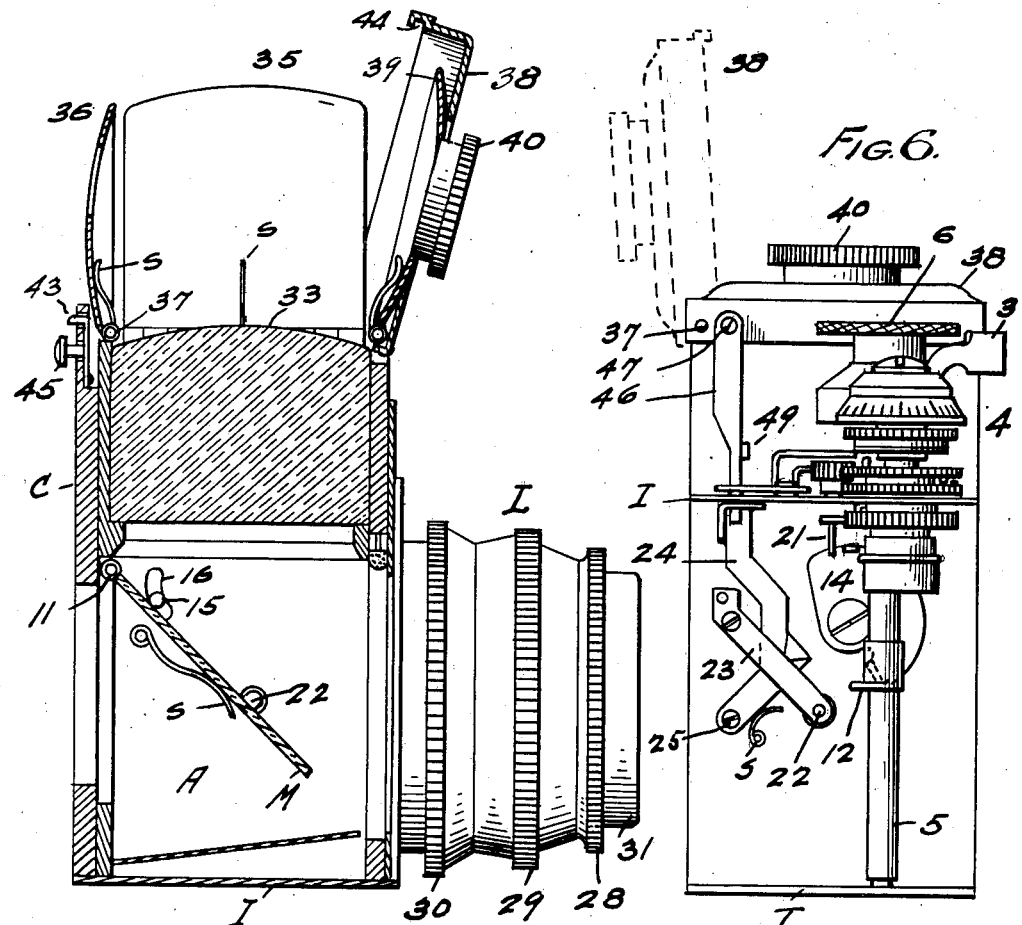
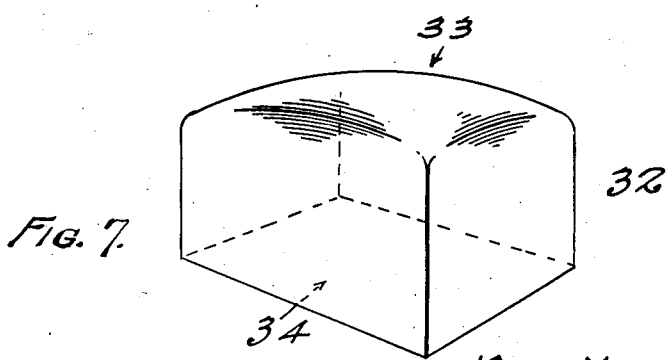

Patented July 11, 1939

2,165,903

UNITED STATES PATENT OFFICE 2,165,903

REFLEX CAMERA

Karl Nuchterlein, Dresden, Germany, assignor to Ihagee Kamerawerk Steenbergen & Co., Dresden, Germany Application April 15, 1937, Serial No. 137,138

2 Claims. (Cl. 95—42)

My present invention relates to improvements in reflex cameras and, while the improvements are well adapted for embodiment in various kinds of cameras, they are especially designed for use in multi-speed, miniature cameras of the roll-film, curtain-shutter type, wherein the operation of changing the film after an exposure automatically sets the shutter, and at the same time this operation sets a reflex mirror, or reflector, in focusing position.

One of the essential features of the improved camera resides in the use of a finder-unit that is employed within the camera, as distinguished from the customary finder found on the exterior of a camera. This finder-unit includes, broadly, a focusing screen, the reflex mirror or reflector, and the camera lens, and the use of the camera lens enables the photographer to find, and correctly compose the image on the focusing screen to thus produce a photograph exactly as the view appears through the finder.

As is well known in the art, the standard minimum size for a miniature or small picture is 4 x 6.5 cm. and photographs of this size may or may not be enlarged, as desired. The finders for cameras adapted to take pictures of smaller sizes than this minimum size, are found to be disadvantageous and objectionable for one reason, among others, that the image is difficult to find because of its small size, and the details of the image cannot readily be identified.

By the embodiment of my invention in the camera, the size of the camera may conveniently be reduced, and the size of the photograph is also reduced, the negatives being of such distinction and clarity as to produce clean-cut images that may readily be enlarged.

To obviate the difficulties, now existing in cameras, in finding and composing a miniature or small size image on the focusing screen, I employ a magnifying glass as the focusing lens or finder lens, and I provide this glass with a translucent face, adjoining the light chamber of the camera, to form the focusing screen. By this use of the high-powered focusing lens and its focusing screen, together with the reflex mirror or reflector in the focal plane, or light chamber, and the photo-lens, the actual miniature picture to be taken, may be magnified by the finder to such large size as to readily permit the image to be composed on the focusing screen with clarity and distinctness.

The use of a single axis for both finding the image and for taking the picture, assures the photographer that the photograph is exactly the same view as that composed on the focusing screen.

Due to the construction and arrangement of parts in my invention, and the embodiment of the invention in the camera, the latter provides a compact, comparatively small, precise, instrument, possessing the characteristics of larger cameras as to accuracy and facility for high speed work, instantaneous exposures, and for longer time-exposures in the production of clear-cut photographs, from which, if desired, enlargements may be made.

The hinged reflector, or reflex mirror, like other parts of the camera, is spring-actuated, for automatic movement to non-focusing or picture-taking position; the operating parts are "set" preferably, by a rotary winding-lever; and the automatically operating parts, after being set, are released by an operating lever through the usual push button, or in other suitable manner.

The magnifying glass or finder-lens embodied within the camera performs the functions of a combined image-finder and image focusing screen, and the glass is fashioned to an extraordinary degree or high magnifying power of precision, with a spherical upper or exterior face, and a translucent or ground, plane, inner face within the camera. The outer spherical face of the magnifying glass is utilized to assist in focusing, or ascertaining the position of small images by enlargement thereof; and the inner, translucent face of the glass receives the image which may be composed and displayed to the photographer in sharp well-defined lines.

The invention consists in certain novel combinations and arrangements of parts embodied in the camera and forming parts thereof, as will hereinafter be more fully pointed out and claimed. In the accompanying drawings I have illustrated one complete example of the physical embodiment of my invention, wherein the parts are combined and arranged according to the best mode I have thus far devised for the practical application of the principles of my invention. It will be understood, however, that changes and alterations may be made in the conventional or exemplifying structures of the drawings, within the scope of my claims, without departing from the principles of my invention.

In the drawings:

Figure 1 is a top plan view of a camera embodying my invention showing by dotted lines the film and its rolls, the front and rear curtains forming the shutter and operating parts therefor; the winding lever and part of the winding-head together with the time-setting dial, in full lines, and also the folded hood, which when automatically opened forms the light shaft above the focusing lens.

Figure 2 is a detail perspective view showing part of the timing-gear-shaft which is utilized to set the reflex mirror, the lock for the shaft, and the means, actuated by the mirror when released, for unlocking the shaft.

Figure 3 is a detail perspective view of the combined operating-lever and cam-lever by means of which the shutter mechanism is released, indirectly, and the set mirror is released directly, a safety pawl being shown by dotted lines for holding this lever inactive when the foldable hood is in folded position.

Figure 4 is a detail perspective view showing an unfolded iconoscope-wall of the foldable hood, together with a folded wall on which is mounted an auxiliary magnifier, the latter being retained in folded or focusing position by means of a spring detent on the iconoscope-wall.

Figure 5 is a central sectional view, as at line 5—5 of Fig. 1, but with the unfolded hood forming the light shaft, showing also the lens mount, and omitting various parts that are not necessary for an understanding of the invention.

Figure 6 is a view looking in the direction of the line 6—6 of Figure 1 and showing the winding head and winding lever, and other operating parts, exterior of the central light chamber of the camera.

Figure 7 is a perspective view of the magnifying glass employed as the combined image finder and focusing screen.

In the general assembly view of Figure 1 the film F and the curtains 1 and 2 forming the shutter, are enclosed within the casing C and therefore indicated by dotted lines, together with the film pack P, and the winding spool W for the film. The camera parts are set by a single turn of the winding lever 3 which turns a spring-wound, rotary driving head, indicated as a whole by the number 4, the head being journaled and supported in frame plates I, exterior of the central light chamber A of the camera.

In addition to winding the film and setting the shutter, the winding-lever also turns the timing mechanism, that includes a shaft 5 with its dial knob and ring 6, through a train of gearing indicated at 7, 8, 9, 10, the gears 7 and 10 being mounted in the driving head 4 and on the gear shaft 5 respectively, and the intermediate pinions 8 and 9, being journaled to transmit power between these gears, as indicated by dotted lines in Figure 1.

Anti-clockwise turning of the shaft 5 as the lever 3 is turned, swings the reflecting mirror M, which is pivoted or hinged at 11 in the light chamber A, to focusing position as indicated in Figure 5, and the mirror is locked in this position. This movement of the mirror is accomplished through the use of a lug 12 on the shaft that contacts with a lug 13 on an oscillatable, loosely-pivoted arcuate plate 14 mounted on the exterior face of one of the walls of the light chamber A. This pivotal plate is provided with a laterally extending pin 15 that projects through an arcuate slot 16 in the wall of the light chamber and the free end of this pin at all times, or constantly, bears on one edge of the reflex mirror M. As the shaft 5 turns to swing the mirror to focusing position, and after the mirror has been swung to that position another lug, as 17, on the shaft is caught and held by a spring-pressed locking lever 18 pivoted at 19 at the under side of one of the plates I, as seen in Fig. 2. When the mirror is released, as will be described, it automatically swings, under tension of its spring S, to horizontal position in Figure 5. In this swinging movement, the mirror lifts or swings the pin 15, thereby oscillating the plate 14, anti-clockwise in Figures 2 and 6, and a pawl or detent 20 on the plate encounters another lug 21 on the locking lever 18. The spring of the mirror is stronger than the spring of the locking lever and therefore, the locking lever is disengaged from the pawl or lug 17 to permit clock-wise turning of the shaft 5.

As the mirror is swung to focusing position, and near the end of its movement, one of its edges snaps past a detent 22 that projects through a hole in the wall of the light chamber A of the camera, and then the mirror is caught by this detent and retained, until the detent is released from the mirror. The detent is mounted rigidly on the free end of a spring blade 23, one end of which blade is fastened to the face of the wall of the light chamber, exterior of the chamber.

The operating lever 24, which performs the dual functions of releasing the shutter (not here described) and releasing the reflex mirror M, is pivoted at 25 on the wall of the light chamber, as indicated in Figure 6, and retained by a spring S. As indicated in Figure 6, the spring blade 23, extends transversely over a portion of the operating lever, and the latter is fashioned with a cam 26 that engages the free end of the spring blade, so that, as the operating lever is swung on its pivot to release the shutter, the initial movement of the lever causes the cam to release the mirror, and the latter then swings to picture taking position, after which the curtain-shutter operates.

Within the lens-mount indicated as a whole by the letter L is carried the iris-diaphragm that is adjusted by turning the knurled ring 28; the lens is turned to focus for distance by the ring 29; and a fastening device for the quick-detachable and interchangeable lens mount is operated by turning the ring 30, a cap 31 being shown as a closure for the lens.

The hinged mirror M, when in focusing position in the light chamber, is directly back of the lens and in line with its axis, and the mirror is located in front of the rear opening of the light chamber, across which opening the two shutter-curtains and the film move in the focal plane. In focusing position the mirror M prevents access of light rays to the front or sensitive face of the film, and in non-focusing position or picture-taking position the mirror prevents access of light rays to the light chamber A from the light shaft above the chamber.

In the light shaft above the light chamber A, I employ a focusing screen, which is embodied in a transparent, rectangular block, or magnifying glass 32 which forms the finder or focusing lens. This focusing lens may be of suitable shape, and it is firmly secured in appropriate manner within the body of the camera in position to entirely close the upper portion of the light chamber A. The lens or glass, which is of substantial thickness or depth, has a spherical upper face 33, and a ground or translucent, plane, bottom face 34, which latter face forms the focusing screen on which the image is located and composed before the exposure of the film takes place. This focusing screen adjoins the light chamber, and it co-operates with the reflex mirror or reflector M, when the latter is in focusing position to receive the image from the lens-mount and transfer or reflect the image to the screen.

In Figure 5 the optical axis passes down through the focusing lens to the mirror, and thence at right angles through the photographic lens, along its longitudinal axis. Thus, by peering at the spherical face of the glass or focusing lens, and due to the high degree of magnification of the glass, the image on the focusing screen appears as a substantial enlargement in the vision of the photographer, who is thereby assisted in the composition of the picture to be taken, and he is enabled to readily focus the image in all its details upon the translucent focusing screen 34, in sharp and well defined lines.

To assist in focusing, I provide a light-shaft above the high-powered focusing lens, which shaft when in use, forms an interior part of the camera for co-operating with the interior focusing lens and the interior light chamber of the camera. This light shaft is formed by the open walls of a sectional, automatically opening, hood, which, as shown in Figures 1 and 6 covers and protects the focusing lens when the hood is folded, and for this purpose the walls of the hood conform to the shape, size, and contour of the focusing lens which is of desired shape and size.

As here shown the light-shaft is substantially rectangular in shape, with two side walls 35, and an iconoscope-wall of rear wall 36, preferably fashioned of thin, but durable metal plates each of which is hinged in suitable manner to the camera body at 37, and provided with a spring as S, for automatically swinging open the walls if and when they are released. The side walls and the rear wall are shaped to conform to the contour of the spherical face of the focusing lens or finder-glass, and the iconoscope-wall with its window is designed especially for use, as in Figure 4, when taking the picture of a moving object.

A rectangular, open-center, cover 38 of the hood is hinged at the front thereof, and a fourth wall or concavo-convex metal plate 39, of the hood, forms part of the light shaft, and in this wall 39 is mounted an auxiliary finder lens 40. This wall 39 with its auxiliary lens swing on the same hinge with the open center cover, and as indicated, the spring pressed plate 39 nests in the open center cover, with the auxiliary finder lens 40 projecting outwardly through the cover.

As seen in Figure 4, the wall 39 may be turned in or folded on its hinge 37 regardless of the cover and of the other walls of the light shaft, and a spring pressed detent 41 mounted on the rear wall, or iconoscope wall 36, holds the wall 36 in this position. Thus the plate 39 may be moved out of the way when the wall 36 is being used as an iconoscope, or, when the plate 39 is in position of Figure 4, the finder lens 40 may be employed as an auxiliary in focusing. By means of a release pin 42 that projects through a slot in the wall 36, the detent 41 may be swung on its pivot to release the wall 39 and then the spring bearing against this wall will automatically swing the wall into the cover 38.

In the operation of folding the hood that forms the light-shaft, the two side walls are first folded in and down over the focusing lens 32, then the rear wall, and finally the front wall and cover are similarly folded down over these folded walls, and the cover may temporarily be retained, by hand, until the cover is automatically snapped or caught and thereafter retained in closed position.

For retaining the hood in closed position, as in Figures 1 and 6, I employ a spring catch 43 of suitable type that is mounted in appropriate manner at the rear of the camera body, and this catch is adapted to engage in a socket 44 or keeper located at the front lower edge of the cover 38, and this catch snaps into the socket when the cover is pressed down to ultimate position. By pressure against the catch-head or button 45 of the spring-catch, which button projects slightly to the rear of the body of the camera, the spring latch or catch may be withdrawn from its keeper, and the spring operated walls and cover then automatically swing on their hinges upwardly and outwardly, to form the light shaft for focusing uses.

In connection with the hinged cover 38 and its hinge 37 I employ a safety device, which co-operates with the operating lever 24 and the focusing mirror or reflex mirror M, to prevent accidental or inadvertent exposure of a film. This safety device includes a latch 46 pivotally suspended at 47 from one side of the hood adjacent the hinge 37 of the cover of the hood. This latch depends from the cover and normally falls by gravity with its free end in a socket 48 at the upper end of the operating lever 24, as best seen in Figure 3, a lug 49 (Fig. 6) being employed to guide the latch. This latch locks the operating lever against movement, (as from the button B) until the hood is first unfolded by releasing the catch 43, then the automatically swinging cover of the hood lifts the latch 46 free of the operating lever, to permit operation of the camera. Then pressure on the button B, or on the flange 50 of the lever 24 may be applied in usual manner to release the mirror M so that it may automatically swing to non-focusing or picture-taking position.

Having thus fully described my invention, what I claim as new and desire to secure by Letters Patent is:

1. The combination in a reflex camera having a central light-chamber and including a magnifying lens closing a portion of said chamber, said lens having an outer spherical finder-face, and an inner translucent face, of an enclosing hood for the lens adapted to form a light shaft and comprising hinged, automatically-opening concavo-convex wall-sections adapted when in closed position to lie in juxtaposition with the spherical finder-face, and a cover, means for retaining the cover to hold the wall-sections in folded position, and means for releasing the retaining means.

2. The combination in a reflex camera having a central light-chamber, and including a magnifying lens closing a portion of said chamber, said lens having an outer convex finder-face, and an inner plane translucent image-forming face, of an enclosing hood for the lens adapted to form a light shaft and comprising hinged spring-opened concavo-convex wall-sections adapted when in closed position to lie in juxtaposition with the convex finder-face, one of said wall-sections having an auxiliary magnifying lens therein, means for retaining the cover to hold the wall-sections in folded position, means for retaining said one wall section in folded position whereby said auxiliary magnifying lens will lie over said first mentioned lens, and separate means for releasing said retaining means.

KARL NUCHTERLEIN.